US009299185B2

(12) United States Patent
Bowles

(10) Patent No.: US 9,299,185 B2
(45) Date of Patent: Mar. 29, 2016

(54) ENHANCED SYSTEM AND METHOD FOR RENDERING VISUAL SURFACE

(71) Applicant: Disney Enterprises, Inc., Burbank, CA (US)

(72) Inventor: Huw Bowles, Brighton (GB)

(73) Assignee: DISNEY ENTERPRISES, INC., Burbank, CA (US)

(*) Notice: Subject to any disclaimer, the term of this patent is extended or adjusted under 35 U.S.C. 154(b) by 317 days.

(21) Appl. No.: 13/765,641

(22) Filed: Feb. 12, 2013

(65) Prior Publication Data
US 2014/0225893 A1 Aug. 14, 2014

(51) Int. Cl.
*G06T 15/20* (2011.01)
*G06T 17/05* (2011.01)

(52) U.S. Cl.
CPC .............. *G06T 15/20* (2013.01); *G06T 17/05* (2013.01)

(58) Field of Classification Search
CPC ....... G06F 3/011; G06T 15/04; G06T 11/001; G06T 19/00
See application file for complete search history.

(56) References Cited

U.S. PATENT DOCUMENTS

2002/0113805 A1* 8/2002 Li et al. ............... 345/649
2012/0249741 A1* 10/2012 Maciocci et al. ............... 348/46

OTHER PUBLICATIONS

Seymour, M. "Assassin's Creed III: The Tech behind (or beneath) the action", fxguide: Interdubs, online article, http://www.fxquide.com/featured/assassins-creed-iii-the-tech-behind-or-beneath-the-action/, 2012, printed Feb. 12, 2013, 9 pages.
Ochoa, C.G., and Holder, D., "Water Technology of Uncharted" (slides), Games Development Conference (GDC), 2012, http://cgzoo.files.wordpress.com/2012/04/water-technology-of-uncharted-gdc-2012, printed Feb. 12, 2013, 156 pages.
Johanson C., "Real-time water rendering—Introducing the projected grid concept", Master of Science Thesis, Lund University, Mar. 2004, 42 pages.
Losasso, F. and Hoppe, H., "Geometry clipmaps: Terrain Rendering Using Nested Regular Grids", ACM Transactions on Graphics (TOG), 2004, 8 pages.
Special Sessions: Technical Challenges of Assassin's Creed III: Real-Time Water Simulation and High-Quality Linear Gameplay Sequences, http://www.siggraph.org/asia2012/special-sessions-detail?id=100-776 , Friday, Nov. 30 16:15-18:00 | Garnet 217, 1 page.

* cited by examiner

*Primary Examiner* — Maurice L McDowell, Jr.
*Assistant Examiner* — Raffi Isanians
(74) *Attorney, Agent, or Firm* — Sheppard Mullin Richter & Hampton LLP

(57) ABSTRACT

An enhanced system and method for rendering virtual surface is disclosed. A grid may be constructed in a world space to provide positions that facilitate the rendering of the virtual surface. The grid may be constructed by intersecting circular lines and radial lines. The distance of circular lines with respect to one another may be determined by intersecting tessellation level and binary tree. Motion caused by a viewpoint transformation may be compensated by adjusting the grid. Rotational change of the viewpoint may compensated by rotating the grid according a degree of grid edge. Translational change of the viewpoint may be compensated by moving or rotating the grid in a direction opposite to the translational change.

12 Claims, 6 Drawing Sheets

ENHANCED SYSTEM AND METHOD FOR RENDERING VISUAL SURFACE

FIELD OF THE DISCLOSURE

This disclosure relates to visual surface rendering based on motion compensation techniques.

BACKGROUND

Systems that generate terrain surfaces, such as ocean surfaces, using projected grid technique is known. In those systems, a grid in a screen space is projected from a projection point onto a plane in a world space. The projected grid creates a grid map on the plane such that the areas closer to the projection point are more densely occupied than those farther away from the projection point. Sampled vertices in such a grid map are processed to create features associated with specific terrains. For example, the sampled vertices may be displaced using associated height values to create a naturalistic appearance of a terrain surface. The so created terrain surface is then rendered in a field of view presented on a display.

On the display, the virtual terrain surface is typically presented in the field of view with a view point, the location of which is correlated with the location of the projection point in the world space (e.g., in some systems the projection point is the view point). Therefore, the projected grid will move as the view point moves. It is known that such movement of the project grid may cause artifact effects. For example, for a virtual ocean space presented on the display, the ocean surface may appear flicker or shudder as the view point moves sideways and causes the projected grid to slide over the ocean.

SUMMARY

One aspect of the disclosure relates to a system and method for rendering a virtual surface by compensating motion caused by view transformation. A grid may be constructed in a world space based on viewpoints from which the virtual surface is viewed. The grid may be constructed by constructing concentric rings centered on the viewpoint and intersecting radial edges and circular edges of the concentric rings. The radii of the circular edges may be determined such that the circular edges closer to the center of the concentric rings are more densely arranged next to one another than those further from the center. View transformation may be determined based on positions of viewpoints over a period of time. When a degree of rotational change of the viewpoint about an axis through the viewpoint that runs perpendicular to the grid is determined, the rotational change may be adjusted according to a radial degree of the grid. When horizontal translational change of the viewpoint in a direction perpendicular to a view direction is determined, the translational change may be compensated by rotating the grid about a "Y" axis perpendicular to the grid. When horizontal translational change of the viewpoint in a direction parallel to the view direction is determined, the translational change may be compensated by moving the grid in the direction opposite to the translational change. Such compensations may position the vertices of the grids stationary or almost stationary in the world space as the viewpoint varies and therefore reduce aliasing effects appearing in the traditional systems.

In some implementations, a system configured to render virtual surface may include one or more processors configured to execute one or more computer program modules. The one or more computer program modules may include one or more of a surface module, a viewpoint determination module, a view transformation module, a world-space module, and/or other modules.

The surface module may be configured to implement an instance of a virtual surface presented on a display based on positions of the virtual surface in a world space. The virtual surface may include, but not limited to, surfaces of ocean, lake, river, pond, desert, hill, mountain, forest, marsh, bog, swamp, tundra, oasis, and/or any other terrain. The world space may be defined by a coordinate system in which visualization (e.g., an image and/or a model) of a terrain surface may be positioned.

The viewpoint determination module may be configured to determine viewpoints from which the virtual surface is viewed in field of views. The viewpoints may be determined based on, such as but not limited to, user inputs, preconfigured rules, scripts (e.g., scripts specifying camera angle change) and/or any other events that may determine the viewpoints. For example, the view point may be determined based on directional input (e.g., finger swipe by a user on a touch screen) indicating a viewpoint position with respect to the virtual space.

The view transformation module may be configured to determine a view transformation based on positions of viewpoints within a period of time. Rotational and/or translational change of a viewpoint may be determined based on the positions of the viewpoint at a time instance T and a time instance T+1. The rotational change may include a degree of rotation by the viewpoint about an axis through the viewpoint and runs perpendicular to the virtual surface in the world space. The translational change may include changes of the viewpoint in a direction perpendicular to the view direction (e.g., sideways) and/or in a direction parallel to the view direction (e.g., forward/backward).

The world-space module may be configured to provide world-space positions of the virtual surface by constructing a grid in the world space. The grid may be constructed based on viewpoints determined by the viewpoint determination module. In some implementations, the grid may be arranged by intersecting portions of circular edges of concentric rings centered on the viewpoint, and radial lines of the concentric rings. The radii of the circular edges may be determined according to intersections of a line representing tessellation level of the virtual surface as desired and a binary tree. Such a grid may be constructed by compensating the motion caused by view transformation as the viewpoint varies. For example, if the viewpoint has moved from a previous position to the current position in a translational manner, the motion caused by the view transformation may be compensated by adjusting the grid such that the vertices of the grid may appear stationary or nearly stationary in the world space.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The embodiments will be more readily understood in view of the following description when accompanied by the below figures and wherein like reference numerals represent like elements, wherein.

DETAILED DESCRIPTION

Figure 1:
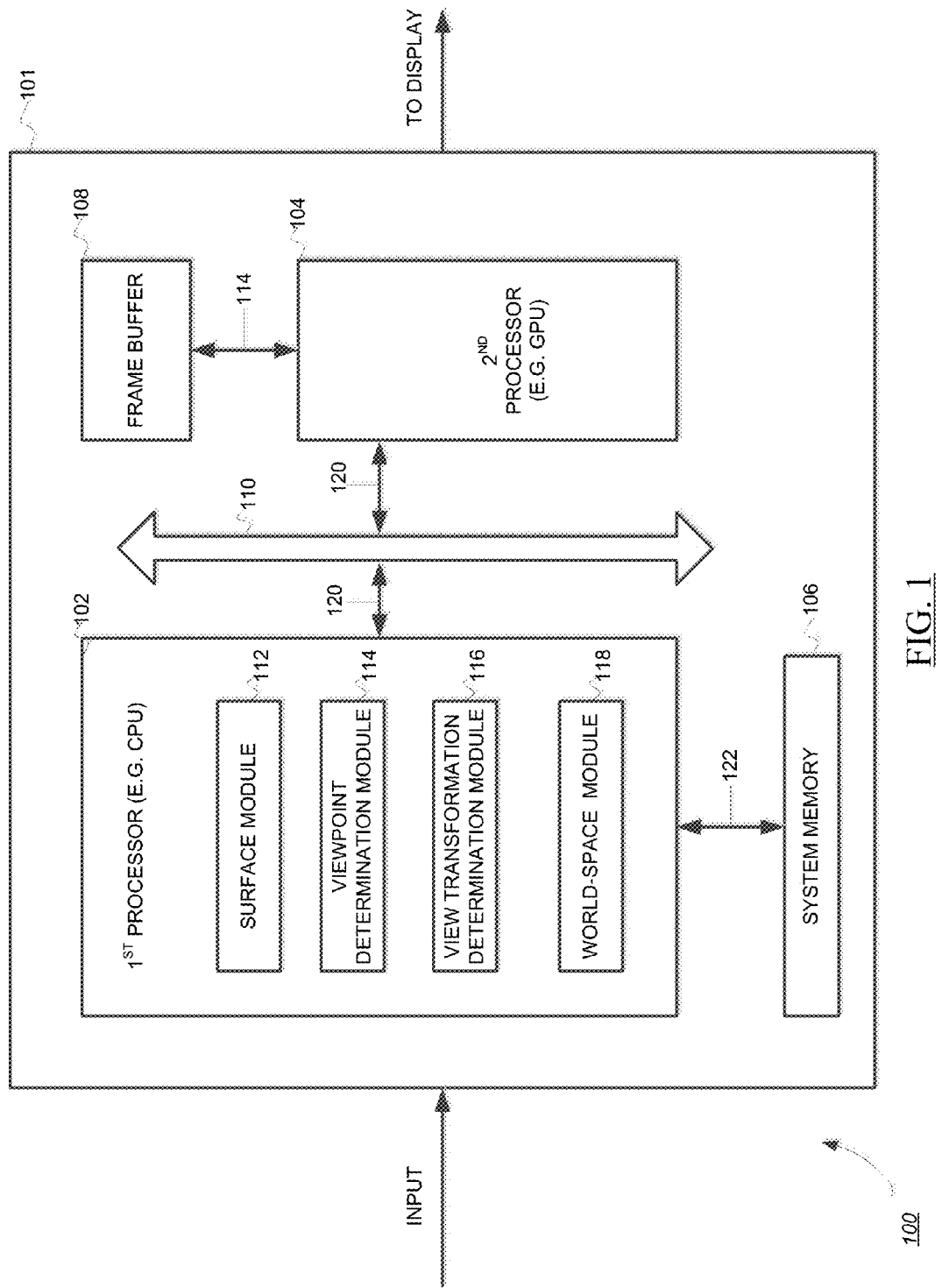
FIG. 1 illustrates one example of a system configured to render virtual surface in accordance with one embodiment of the disclosure.

FIG. 1 illustrates one example of a system 100 configured to rendering virtual surface in accordance with one example of the disclosure. The system 100 may include any suitable device 101, for example, handheld device (e.g., mobile or smart phone, tablet, etc.), computer server, a laptop computer, desktop computer, media center, gaming console, set top box, printer or any other suitable device, to name a few. This includes virtualized resources and/or devices implemented "in the cloud." In this example, the device 101 employs a first processor 102 operatively connected to system memory 106 and a second processor 104 operatively connected to frame buffer 108. This is merely illustrative, as device 101 may be implemented with more or less processors than those shown. One or both of first processor 102 and/or second processor 104 may include a plurality of processing units operating in coordination in some other examples. As shown in this example, the first and second processors may be connected using a data bus or point to point connections, such the system bus 110, which transfers data between each structure of the system 100. Although not shown, the system 100 may also include an input device, such as but not limited to, touch screen, motion sensor, mouse, trackball, touchpad, digitizing tablet, joystick, pointing stick, keypad, keyboard, camera, remote controller or any other suitable input device. The system 100 may also include a display, which is also not shown in this example. The display may include touch screen, liquid crystal display (LCD), light-emitting diode (LED) display, organic LED (OLED) displays, cathode ray tube (CRT) display, plasma display, projector screen, electroluminescent displays, vacuum fluorescent (VF) display, laser display, E-ink display or any other suitable displays, to name a few. The display may be configured to receive inputs from a user, for example a touchscreen. One of ordinary skill in the art will recognize other suitable structure, such as but not limited to, a storage device, a memory controller, an i/o subsystem and/or any other structure may also be included in the system 100.

In some implementations, system 100 may include a server 101 employed in a client/server architecture that includes one or more of a server 101 and/or other components. In those implementations, server 101 may include communication lines, or ports to enable the exchange of information with a network and/or other computing platforms. The processor 102 included in the server 101 may be configured to execute computer program modules via one or more of hardware, software, and/or firmware. Although one server 101 is illustrated, it is understood that the number of servers 101 may vary in some other examples. In those examples, the modules executed, as shown in this example, by the first processor 102 may be distributed on the same and/or different servers 100. Users may interface with system 100 via a client device through one or more electronic communication links. For example, such electronic communication links may be established, at least in part, via a network such as the Internet and/or any other suitable wired or wireless communication links in the art. In those embodiments, the client device may include one or more processors configured to execute computer program modules. The computer program modules may be configured to enable one or more users associated with the given client computing platform to interface with system 100, and/or provide other functionality attributed herein to client device. By way of non-limiting examples, the given client computing platform may include one or more of a smartphone, a tablet, a desktop computer, a laptop computer, a handheld computer, a NetBook, and/or other computing platforms.

In this example, the first processor 102 may include a host central unit (CPU) having multiple cores however any suitable processor may be employed including a DSP, APU, GPGPU or any other suitable processor or logical circuitry. The first processor 102 may be bi-directionally connected to other components of the system 100 via the system bus. The second processor 104 may include a graphics processing unit (GPU), which drives the display device via a display connector, such as analog display connectors, for example, composite video, S-Video, VGA, digital display connectors, for example, HDMI, mini-DVI, micro-DVI, wireless connectors or any other suitable connectors. It is understood that, in some other examples of system 100, the first processor 102 may be integrated with the second processor 104 to form a general processor. In addition, although the system memory 106 and the frame buffer 108 are shown in FIG. 2 as two separate components in the system 100, it is also understood that a unified memory architecture that can accommodate all the processors may also be employed in some other examples of the system 100.

In this example, as shown, the first processor 102 may be configured to execute a surface module 112, viewpoint determination module 114, view transformation determination module 116, world-space module 118 and/or any other modules. The "module" referred to herein is any suitable software module, hardware, firmware or any suitable combination thereof that can perform the desired function, such as programmed processors, discrete logic, for example, state machine, to name a few. It is further understood that these modules may be included in the first processor 102 as part of the first processor 102, or a discrete component of the system 100 that can be executed by the first processor 102, such as software programs stored on computer readable storage medium that can be loaded into the system 100 and executed by the first processor 102. It is still understood that these modules may be combined in some other examples to form an integrated module that performs the combined functions of these modules as described herein. It is still understood the number of modules may vary in some other examples such that, for example, more than one space modules 112 may be included in the first processor 102. These modules may communicate with structures in the system 100 such as but not limited to the system memory 106, the second processors 104 and the frame buffer 108 via any suitable communication link, such as the system bus 110.

Also shown in this example is the second processor 104, operatively connected to the frame buffer 124 via any suitable communication link. The second processor 104 in this example is a graphics processing unit (GPU) that may be configured to process graphics information for a display, which is not shown in this example. The second processor 104 may be configured to receive graphics information 120 from the first processor 102, e.g., from an output of surface module 112. The second processor 104 may be configured to process graphics information to facilitate a presentation of the graphics information on the display. As shown, the second processor 104 may be connected to the frame buffer 108 for storing and retrieving information 124 to facilitate the processing of graphics information on the second processor 104.

As shown, the first processor may be configured to execute the surface module 112 configured to provide a virtual surface by implementing an instance of the virtual surface to determine a view of the virtual surface for presentation on the display. A virtual surface may comprise a simulated surface (e.g., a physical space) instanced on a computing device and/or server (e.g., system 100) that is accessible by a client. In some other examples, the computing device and client (e.g., a display) may be integrated to form a standalone device that provides the virtual surface, such as a smart phone, tablet, laptop, handheld and/or any other standalone device. In any case, the simulated surface (i.e. the virtual surface) may include topography with one or more terrains, such as but not limited to, lake, river, pond, desert, hill, mountain, forest, marsh, bog, swamp, tundra, oasis, and/or any other terrains. In other instances, the topography may be a 3-dimensional topography. The topography may include dimensions of the virtual surface, and/or surface features.

The surface module 112 may be configured to determine a view having a field of view. A view of the virtual surface may correspond to a location in the virtual surface in a world space (e.g., the location in the virtual surface from which the field of view is taken). Based on the field of view, the surface module 112 may be configured to determine representation information about the virtual surface.

The viewpoint determination module 114 may be configured to determine positions of viewpoints from which the virtual surface may be viewed in the field of views. In some instances, the viewpoint may have a coordinate system of its own, e.g., when determining a rotational position of the viewpoint. In some instances, the viewpoint may be referenced using positions of the world space where the virtual surface is also defined. In some implementations, the viewpoint determination module 114 may be configured to receive user input indicating positions of a viewpoint. For example, a user may tap on a touch sensitive screen displaying a virtual surface to indicate that virtual surface may be viewed from a point with respect to the virtual surface. The user input may also include input indicating direction change, such as but not limited to, finger swipe, pointer movement, mouse movement, voice command, gesture, hand movement and/or any other input indicating a direction change. Based on such directional input, the viewpoint determination module 114 may be configured to change the viewpoint accordingly.

In some implementations, the viewpoint determination module 114 may be configured to determine positions of viewpoints based on preconfigured rules, e.g., those configured at a manufacturing stage of the system 100. For example, the system 100 may be configured to provide a video game which has programming rules that specify viewpoint change of a virtual surface based on one or more events in the video game. For instance, when a character, e.g., controlled by a user, jumps over a cliff and thus travels in the air, the viewpoint change may be determined based on the impact of gravity and/or wind on the character. In some implementations, the viewpoint determination module 114 may be configured to determine positions of viewpoints based on a script, e.g., that of an animation sequence. For example, the animation sequence may be scripted to change viewpoint based on a plot.

The view transformation module 116 may be configured to determine a view transformation based on positions of viewpoints within a period time. Rotational change of a view point may be determined through a coordinate system with a Y axis running through and perpendicular to the viewpoint. In some instances, the view transformation module 116 may be configured to determine the rotational change by comparing the rotational positions of the viewpoint at time T and at time T+1. For example, the viewpoint may be determined by the viewpoint determination module 114 at a +30 rotational degree about the Y axis at time T, and at +33 degree about the Y axis at time T+1. Based on this positional information, the view transformation module 116 may be configured to determine that the viewpoint has rotated about the Y axis for +3 degrees from time T to time T+1.

Translational change of the viewpoint may be determined based on positions of the viewpoint in the world space. For example, the position of viewpoint may be determined at time T to be at (X, Y, Z) with respect to a coordinate system of the world space and at (X',Y',Z') at time T+1. Accordingly, the view transformation module 116 may be configured to determine that the viewpoint has moved, between time T and T+1, by X'-X in a direction perpendicular to the view direction (i.e., strafing or swaying); by Y'-Y in a direction orthogonal to the view direction (i.e., up/down); and by Z'-Z in a direction of parallel to the view direction (i.e., backward/forward). It is understood that although the above rotational change and translational changes of a viewpoint are described as separate movements, the viewpoint change may include both translational and rotational changes in the same instance: e.g., the viewpoint may be rotated and as well as strafed from time T to time T+1 by a directional input from a user. In such an instance, the view transformation module 116 may be configured to determine translational change and as well as rotational change as described above.

The world-space module 118 may be configured to provide world-space positions of the virtual surface by constructing a grid in the world space. The grid may be constructed based on viewpoints determined by the viewpoint determination module 114. In some implementations, the grid may be arranged by intersecting portions of circular edges of concentric rings, and radial lines of the concentric rings. The concentric rings may be constructed on a plane in the world space. The center of the concentric rings may be a point in the virtual surface projected from the viewpoint. The radii of the rings may be determined such that they increase incrementally from the center towards infinity. In some examples, an optimal number of rings may be determined, for example 40 rings, such that they form sufficient details of the virtual surface viewable from the viewpoint that may be rendered. The grid may be constructed based on a degree of field of view. In one example, a field of view may be 60 degree centered on a viewpoint in the field of view. Accordingly, the grid may be constructed by clipping the portion of the concentric rings to form the 60 degree field of view.

A number of radial lines may be determined to intersect the circular edges to form vertices. In some instances, the radial lines may be configured such that they divide the circular edges uniformly. An optimal number of redial lines may be determined, for example 30 radial lines, to divide the circular edges into portions that may be rendered. Therefore, in an example where the field of view is 60 degree, 1200 verticies may be constructed by intersecting 60 degree circular edges of the concentric rings, i.e., 40 rings with uniform radial lines, i.e. 30 radial lines, which divide the 60 degree circular edges into numerous 2 degree grid edges. The vertices may be processed (e.g., sampled) by the system 100, e.g., through surface module 112, to render the virtual surface, e.g., by adding texture, lighting, wave, displacement, and/or any other appropriate surface features to the sampled vertices. In some implementations, the world-space module 118 may be configured to determine the length of the radii of the circular edges by intersecting a line with a binary tree, which will be described with further details in FIG. 5.

The world-space module 118 may be configured to construct the grid by compensating motion caused by view transformation as the viewpoint varies. This may result in the vertices of the grid appearing stationary or near stationary in the world space. As described above, rotational and translational changes of the view point may be determined by view transformation module 116. Rotational changes of the view point may be compensated by adjusting a degree of rotation to the nearest multiple of grid edge degree, which will be described in further details in FIGS. 2A-C. Translational changes of the viewpoint may be compensated by rotating or moving the grid in a direction opposite of the translational changes of the viewpoint, which will be described in details in FIG. 2D-E.

Figure 2A:
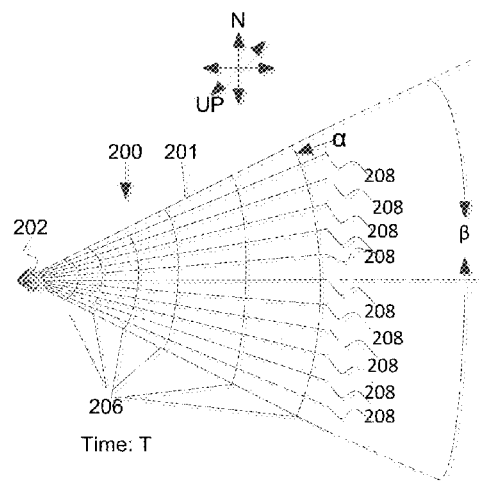
FIGS. 2A-E illustrate various examples of rendering virtual surface using the system as shown in FIG. 1.
Figure 2B:
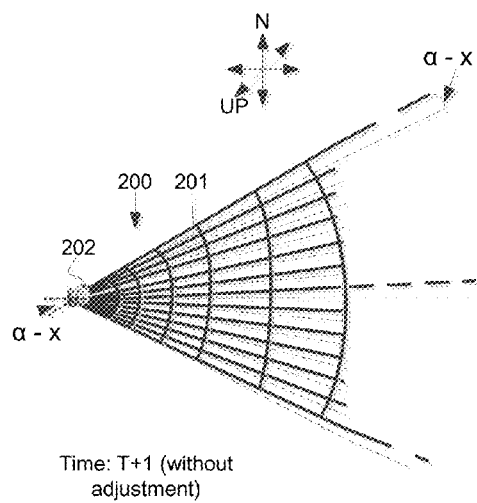
Figure 2C:
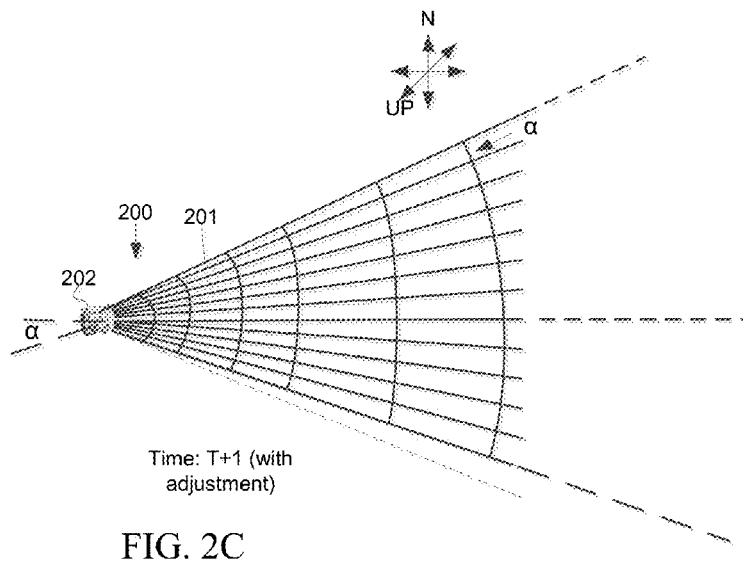

FIGS. 2A-E illustrate various examples of rendering virtual surface in accordance with the disclosure. FIGS. 2A-C illustrate one example of constructing a grid in a world space 200 by compensating a rotational motion caused by a viewpoint transformation. The world space 200 may include a 2D space or 3D space coordinated with any appropriate coordinate system. In FIGS. 2A-C, the world space 200 is shown as a 3D space. As shown, at time T, a viewpoint 202 is looking in an east-ward direction in the world space 200 in FIG. 2A. As shown, a grid 201 may be constructed based on the position of the viewpoint 202 and the field of view centered on the view point 202. The field of view has a $\beta°$ in this example. Accordingly, a set of $\beta°$ circular edges 206 may be constructed in the world space 200 as shown. The circular edges 206 may be portions of concentric rings centered on a position in the virtual surface. In some instances, such a position may be a point in the virtual surface to which the viewpoint 202 is projected.

Also shown in FIG. 2A are radial lines 208 that intersect the circular edges 206. As shown, the intersections form a number of vertices on grid 201. The number of circular edges 206 and radial lines 208 may be determined based on a level of granularity desired for the rendering of virtual surface on the display. Finer granularity may result in higher resolution of the virtual surface rendered on the display and vice versa. The level of granularity may be defined by a number of vertices contained in the grid 201 and a degree of grid edge a as shown, which may be represented by the following formula:

$N_C$=A number of circular edges;

$N_R$=A number of radial lines;

$\beta$=degree of field of view;

Total number of vertices contained in the grid=$N_C \times N_R$;

Grid edge degree $\alpha = \beta/N_R$

FIG. 2B illustrates that, at time T+1, the viewpoint 202 has rotated about a Y axis that runs through the viewpoint 202 and perpendicular to the grid 201 for $\alpha-x°$, where $x<\frac{1}{2}\alpha$. As shown, the grid 201 may be constructed based on the position of the view point 202 at time T+1 such that the grid 201 appears to be rotated by $\alpha-x$ without an adjustment that compensates the rotational motion of the viewpoint 202. As also shown, this may lead to a movement of the grid 201's vertices in world space and when rendered, the virtual surface may appear to shudder due to the vertices' movements.

FIG. 2C illustrates that an adjustment may be applied, for example by the world-space module 118, to reduce the vertices movements by compensating the rotational change of the viewpoint. As shown, an adjustment of $+x°$ may be determined and the grid 201 may be further rotated by the $+x°$ such that the grid rotates by $\alpha°$ instead of $\alpha-x°$. In this example, because x is smaller than $\frac{1}{2}\alpha$, the grid 201 may be rotated in the direction same as that of the viewpoint rotation. However in cases where x is greater than $\frac{1}{2}\alpha$, the grid 201 may be rotated in the direction opposite to the viewpoint rotation. For example, if the viewpoint 202 has rotated by $4\alpha-x$, where $x>\frac{1}{2}\alpha$, an adjustment of $-(\alpha-x)$ may be determined such that grid will be rotated by $3\alpha$ degrees instead of $4\alpha-x$ degrees. In any case, as the viewpoint 201 is so adjusted, the vertices of grid 201 may appear stationary or nearly stationary in the world space 200 despite the rotational motion caused by the transformation of viewpoint 201.

Figures 2D, 2E:
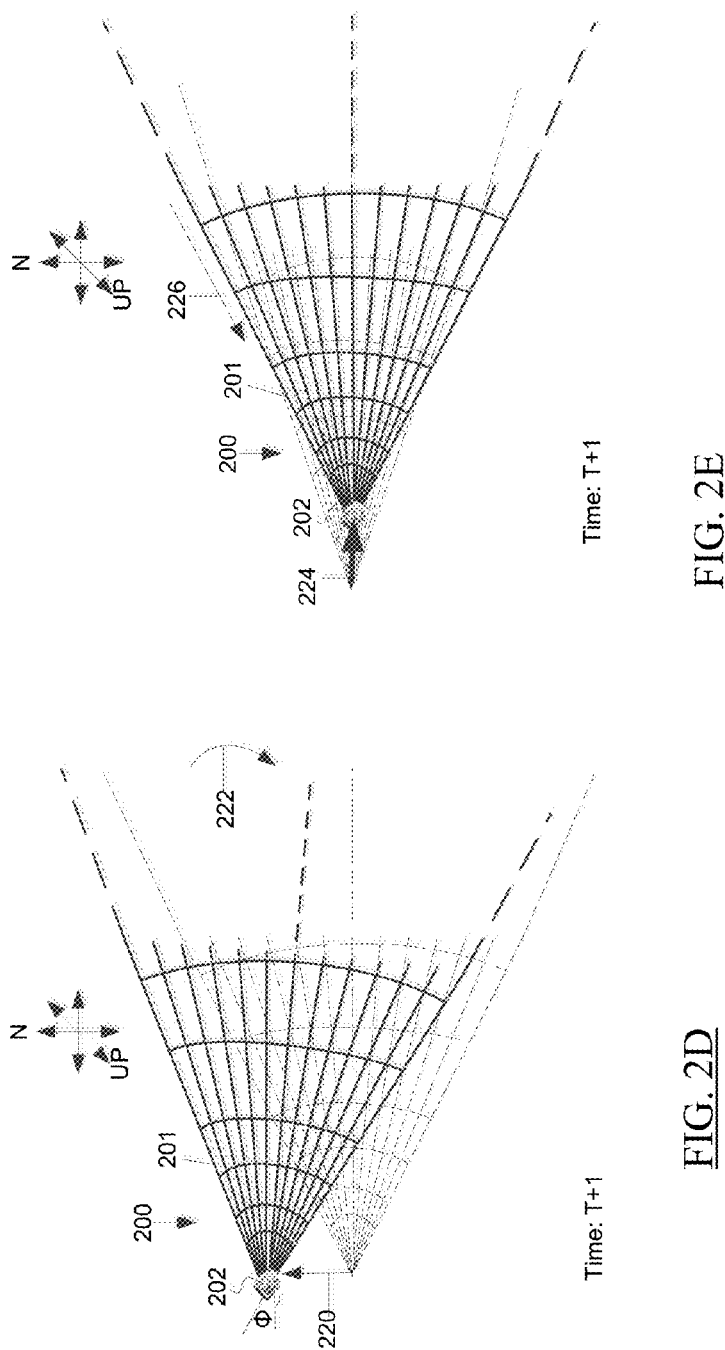

FIG. 2D illustrates an example of applying adjustment to reduce motion caused by a translational change of the viewpoint 202. As shown, at time T+1, the viewpoint 202 has moved as indicated by the arrow 220. As the viewpoint 202 so moves (e.g., sideways), the vertices of grid 201 constructed based on the viewpoint 202's position at time T+1 appears to be rotated as compared to the grid 201's positions at time T (illustrated in dotted line) in the world space 200 as shown. As also shown, to compensate such a translational change, a rotational adjustment as indicated by the arrow 222 may be applied to the grid 201 to reduce the vertices movement caused by the translational change of viewpoint 202. However, the vertices of the grid 201 will rotate at different speeds depending on their distance to the view point 202—i.e., slow near the viewpoint and fast further away. Accordingly, the rotational adjustment may be determined to cause some vertices of the grid 201 appear nearly stationary despite the translational change. In some instances, vertices appearing in the mid-ground or background may be determined to be held stationary as the viewpoint 202 moves sideways since they may be more susceptible to aliasing effect as compared to the vertices appearing the foreground (near the viewer).

FIG. 2E illustrates another example of applying adjustment to reduce motion caused by another translational change of the viewpoint 202. As shown, at time T+1, the viewpoint 202 has moved as indicated by the arrow 224. As the viewpoint 202 so moves (e.g., forwards), the vertices of grid 201 constructed based on the viewpoint 202's position at time T+1 appears to be moved forward as compared to the grid 201's positions at time T (illustrated in dotted line) in the world space 200 as shown. As also shown, to compensate such a translational change, a rotational adjustment as indicated by the arrow 226 may be applied to the grid 201 to reduce the vertices movement caused by the translational change—i.e. to pull the vertices of the grid 201 inwards to compensate for the motion.

Figure 3:
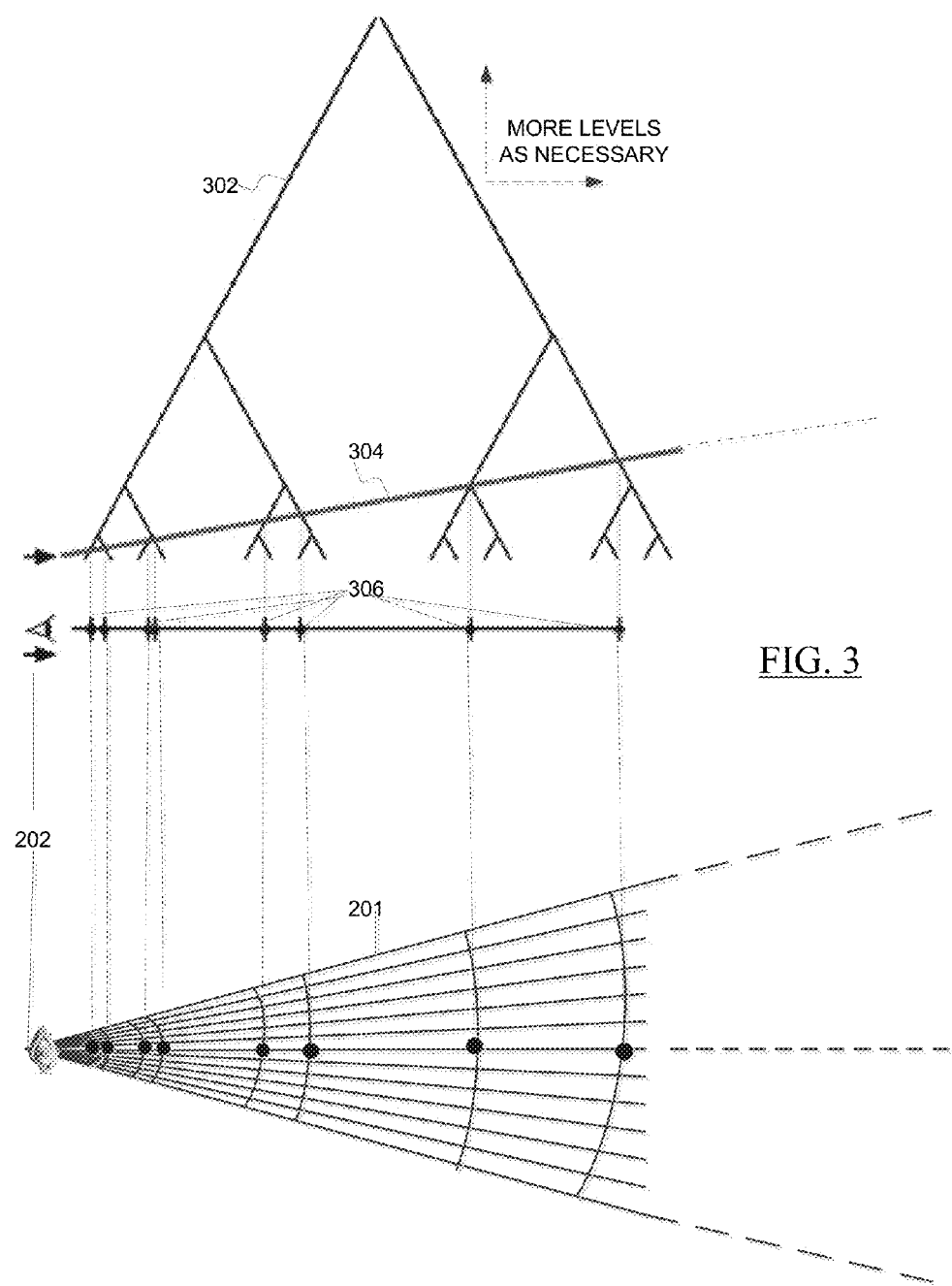
FIG. 3 illustrates one example of constructing a grid in accordance with one embodiment of the disclosure.

FIG. 3 illustrates an example of determining distances of radii for the circular edges when constructing the grid 201. As shown in this example, the distances may be determined by intersecting a line 304 representing desired tessellation level and a multi-level binary tree 302. The binary tree 302 is structured such that at height x in the tree, the average horizontal space between the nodes is also x. It is understood although four levels are shown in the binary tree 302 in FIG.

3, this is merely illustrative. The number of levels in the binary tree 302 may vary as necessary. For instance, the number of levels in the binary tree 302 may be determined based on the number of circular edges to be used for constructing the grid 201 as described above. The line 304 may represent a tessellation level desired for the virtual space. The slope of the line 304 may represent an increment or decrement of the tessellation level. In this example, the slope represents a decrement of tessellation level such that the lower end of the line 304 on the left represents higher tessellation level than the higher end on the right. It is understood that the line 304 may represent any function that specifies tessellation details for rendering the virtual surface. Although, the line 304 is illustrated as linear, this is merely illustrative. It is understood that the shape of line 304 may vary in other examples depending on the function it represents. For example, the line 304 may be a curve representing an exponential function. Also shown in FIG. 3 are dots 306 representing intersections between the line 304 and the binary tree 302. At an instance of virtual surface, a position of viewpoint 202 may be determined as described above. Based on this position, the dots 306 may be used to determine the radii of circular edges of the 201 as shown.

Figure 4:
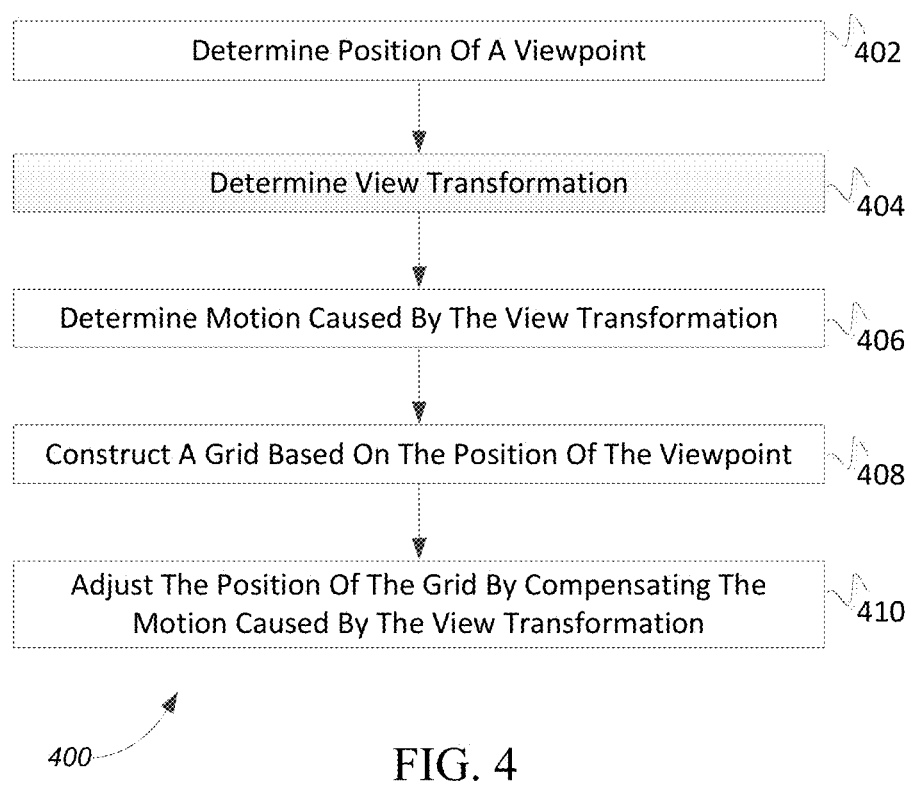
FIG. 4 illustrates one exemplary method of rendering virtual surface in accordance with one embodiment of the disclosure.

FIG. 4 illustrates an example of method 400 for rendering virtual space in accordance with one embodiment of the disclosure. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At operation 402, a position of a viewpoint may be determined. The viewpoint may include a location in the world space from which the virtual surface is viewed. In some implementations, operation 402 may be performed by a viewpoint determination module the same as or similar to viewpoint determination module 114 (shown in FIG. 1 and described herein).

At operation 404, view transformation may be determined. The view transformation may include rotational and/or translational change of the viewpoint. In some implementations, operation 402 may be performed by a view transformation determination module the same as or similar to view transformation determination module 116 (shown in FIG. 1 and described herein).

At operation 406, a grid may be constructed based on the position of the view point. In some implementations, operation 406 may be performed by a world-space module the same as or similar to world-space module 118 (shown in FIG. 1 and described herein).

At operation 408, the position of the grid, as constructed in operation 408, may be adjusted to compensate motion caused by the view transformation, as determined in operation 404. In some implementations, operation 408 may be performed by a world-space module the same as or similar to world-space module 118 (shown in FIG. 1 and described herein).

At operation 410, an instance of the virtual surface may be implemented based on the vertices provided by the grid. In some implementations, operation 410 may be performed by a surface module the same as or similar to surface module 112 (shown in FIG. 1 and described herein).

Figure 5:
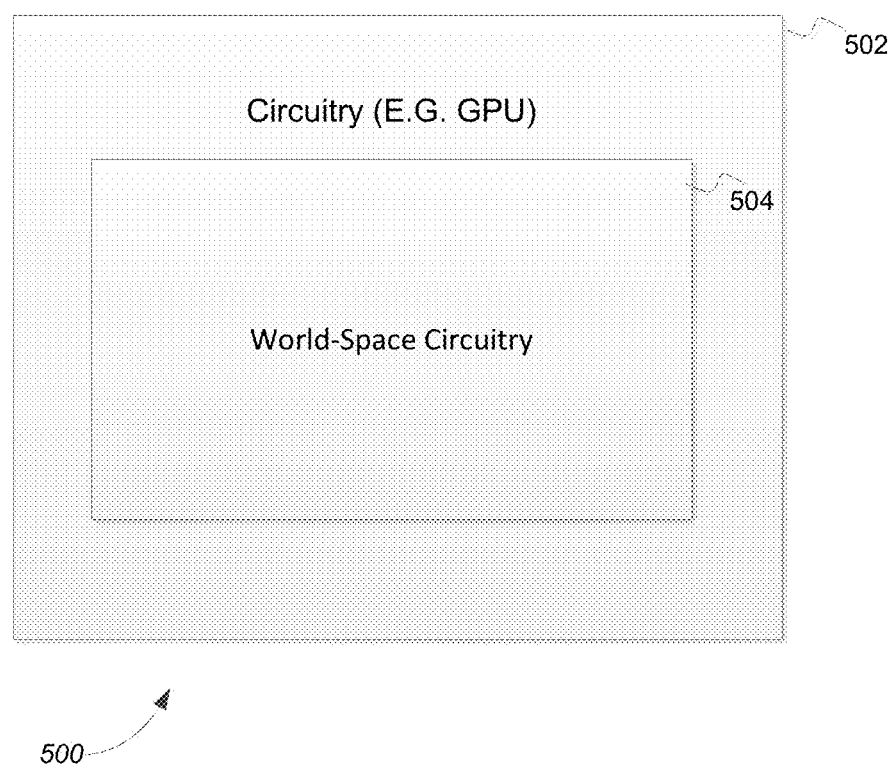
FIG. 5 illustrates one example of apparatus configured to render virtual surface.

FIG. 5 illustrates an example of apparatus 500 for rendering virtual surface in accordance with one embodiment of the disclosure. As shown the apparatus 500 may include circuitry 502. The circuitry 502 may include electronic circuits, one or more processors (e.g., GPUs), combinational logic circuits, an ASIC, and/or other suitable components. In this example, as shown, the circuitry 502 includes world-space 504 sub-circuitry that may perform functionality same as or similar to that performed by world-space module 118 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to render virtual surfaces, the system comprising:
    one or more processors configured by machine-readable instructions to:
        implement an instance of a virtual surface for presentation on a display, the presentation of the virtual surface being based on positions of the virtual surface in a world space;
        determine positions of viewpoints from which the virtual surface is viewed in fields of view, the viewpoints including a first viewpoint;
        determine a view transformation based on positions of the first viewpoint;
        determine world-space positions of the virtual surface by constructing a virtual grid in the world space on which the virtual surface is rendered, the world-space positions of the virtual surface being determined based on the positions of the first viewpoint, wherein the construction of the grid comprises:
            compensating for motion caused by the view transformation as the position of the first viewpoint changes; and
        wherein the construction of the grid further comprises:
            constructing concentric rings in the world space based on the first viewpoint; and
            intersecting circular edges of the concentric rings with radial lines of the concentric rings;
        determine a degree of rotational change of the first viewpoint as the position of the first viewpoint changes, the rotational change being about an axis that runs through the first viewpoint and is perpendicular to the grid; and
        responsive to a determination of the rotational change, compensate for the rotational change by rotating the grid.

2. The system of claim 1, wherein the one or more processors are further configured by machine-readable instructions to determine radii of the circular edges such that the radii increase according to intersections of a line and a binary tree.

3. The system of claim 1, wherein the rotational change is compensated for by rotating the grid according to the radial degree of the grid.

4. The system of claim 1, wherein the one or more processors are further configured by machine-readable instructions to:
   determine a translational change of the first viewpoint as the position of the first viewpoint changes, the translation change being along an axis that runs through the first viewpoint and is parallel to the grid; and
   responsive to a determination of the translational change at an instance of the virtual surface, compensate for the translational change by adjusting the grid according to the translational change.

5. An apparatus configured to render virtual surfaces, the apparatus comprising:
   a memory; and
   one or more processors configured by machine-readable instructions to:
      implement an instance of a virtual surface for presentation on a display, the presentation of the virtual surface being based on positions of the virtual surface in a world space;
      determine positions of viewpoints from which the virtual surface are viewed in field of views, the viewpoints including first viewpoint;
      determine a view transformation based on positions of the first viewpoint within a period; and
      determine world-space positions of the virtual surface by constructing a virtual grid in the world space on which the virtual surface is rendered, the positions of the virtual surface being determined based on the positions of the first viewpoint, wherein the construction of the grid comprises:
         compensating for motion caused by the view transformation as the position of the first viewpoint changes; and
      wherein the construction of the grid further comprises:
         constructing concentric rings in the world space based on the first viewpoint; and
         intersecting circular edges of the concentric rings with radial lines of the concentric rings;
      determine a degree of rotational change of the first viewpoint as the position of the first viewpoint changes, the rotational change being about an axis that runs through the first viewpoint and is perpendicular to the grid; and
      responsive to a determination of the rotational change, compensate for the rotational change by rotating the grid.

6. The apparatus of claim 5, wherein the one or more processors are further configured by machine-readable instructions further configured to determine radii of the circular edges such that the radii increase according to intersections of a line and a binary tree.

7. The apparatus of claim 5, wherein the rotational change is compensated for by rotating the grid according to the radial degree of the grid.

8. The apparatus of claim 5, wherein the one or more processors are further configured by machine-readable instructions to:
   determine a translational change of the first viewpoint as the position of the first viewpoint changes, the translation change being along an axis that runs through the first viewpoint and is parallel to the grid; and
   responsive to a determination of the translational change, compensate for the translational change by adjusting the grid according to the translational change.

9. A computer-implemented method for rendering virtual surfaces, the method being performed by a computer system comprising one or more processors and storage media storing machine-readable instructions, the method comprising:
   implementing an instance of a virtual surface for presentation on a display, the presentation of the virtual space being based on positions of the virtual surface in a world space;
   determining positions of viewpoints from which the virtual surface are viewed in field of views, the viewpoints including a first viewpoint;
   determining a view transformation based on positions of the first viewpoint within a period;
   determining world-space positions of the virtual surface by constructing a virtual grid in the world space on which the virtual surface is rendered, the positions of the virtual surface being determined based on the positions of the first viewpoint, wherein the construction of the grid comprises:
      compensating for motion caused by the view transformation as the position of the first viewpoint changes; and
   wherein the construction of the grid further comprises:
      constructing concentric rings in the world space based on the first viewpoint; and
      intersecting circular edges of the concentric rings with radial lines of the concentric rings;
   determining a degree of rotational change of the first viewpoint as the position of the first viewpoint changes, the rotational change being about an axis that runs through the first viewpoint and is perpendicular to the grid; and
   responsive to a determination of the rotational change, compensating for the rotational change by rotating the grid.

10. The computer-implemented method of claim 9, further comprising determining radii of the circular edges such that the radii increase according to intersections of a line and a binary tree.

11. The computer-implemented method of claim 9, wherein the rotational change is compensated for by rotating the grid according to the radial degree of the grid.

12. The computer-implemented method of claim 9, further comprising:
   determining a translational change of the first viewpoint as the position of the first viewpoint changes, the translation change being along an axis that runs through the first viewpoint and is parallel to the grid; and
   responsive to a determination of the translational change at an instance of the virtual surface, compensating for the translational change by adjusting the grid according to the translational change.

* * * * *